United States Patent [19]

De Luca et al.

[11] 4,237,346
[45] Dec. 2, 1980

[54] BRIDGE LIFTER MODULE

[75] Inventors: Paul V. De Luca; Michael C. Fasano, both of Port Washington, N.Y.

[73] Assignee: Porta Systems Corp., Syosset, N.Y.

[21] Appl. No.: 75,688

[22] Filed: Sep. 14, 1979

[51] Int. Cl.$^3$ .......................................... H04M 13/00
[52] U.S. Cl. .................................. 179/35; 179/1 PC; 179/17 R
[58] Field of Search ............ 179/35, 98, 17 R, 17 A, 179/18 F, 18 FA, 31, 16 F, 30

[56] References Cited

U.S. PATENT DOCUMENTS

| | | | |
|---|---|---|---|
| 3,073,908 | 1/1963 | Hochgraf et al. | 179/35 |
| 3,189,689 | 6/1965 | Hochgraf | 179/35 |
| 3,284,575 | 11/1966 | Howard | 179/31 |
| 3,703,610 | 11/1972 | Ebbe et al. | 179/35 |
| 3,881,068 | 4/1975 | Jones, Jr. et al. | 179/35 |
| 4,166,931 | 9/1979 | MacPherson et al. | 179/35 |

*Primary Examiner*—Gerald L. Brigance
*Attorney, Agent, or Firm*—Charles E. Temko

[57] ABSTRACT

An improved telephone circuit protector module incorporating a bridge lifter switching means which permits direct connection of party line subscriber circuits to a terminal block with the elimination of prior art saturable bridge lifters normally mounted upon a main distributing frame, and accompanying cable runs. The bridge lifter module comprises a solid state thick film circuit formed upon a ceramic substrate, suitably encapsulated, and is sufficiently small in overall size to fit within a connecting module which engages the electrically conductive spring fingers present on certain types of known connector blocks.

3 Claims, 7 Drawing Figures

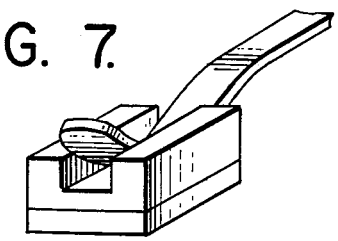
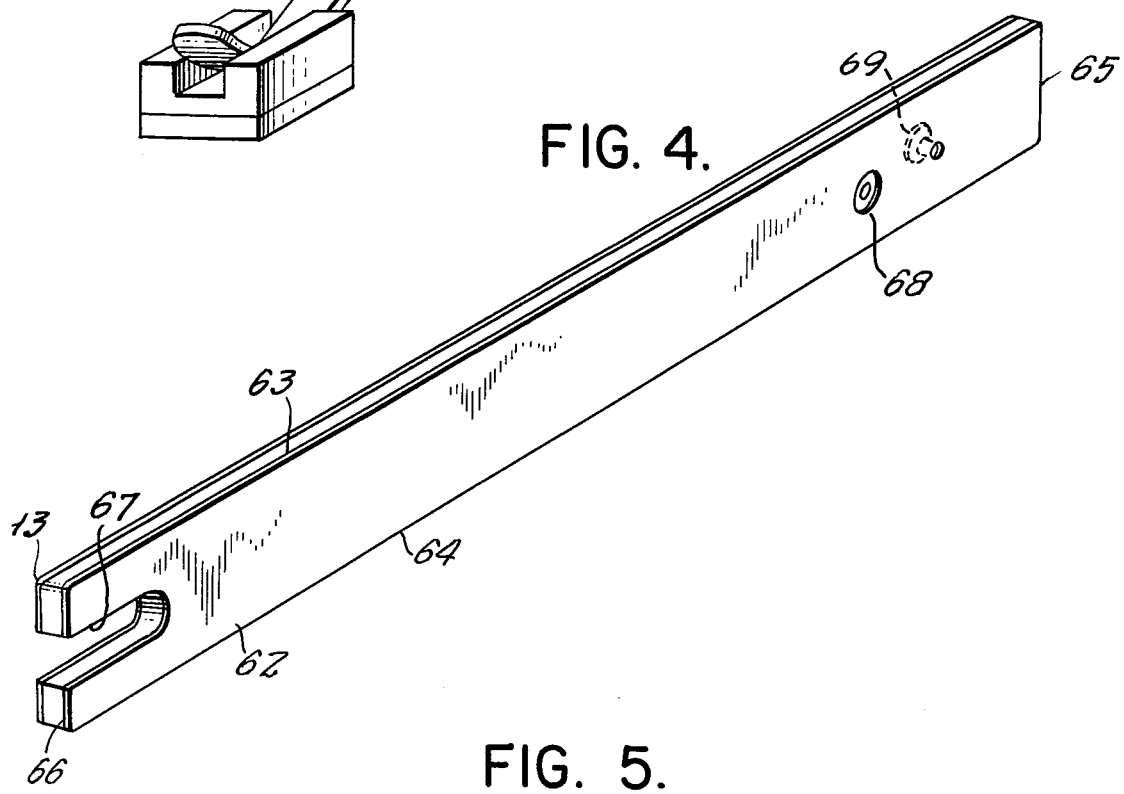
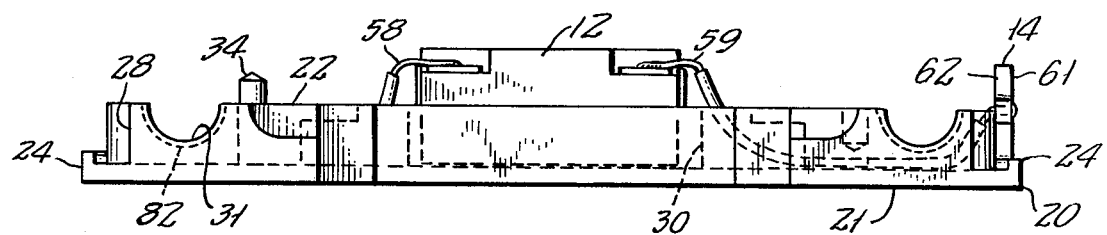
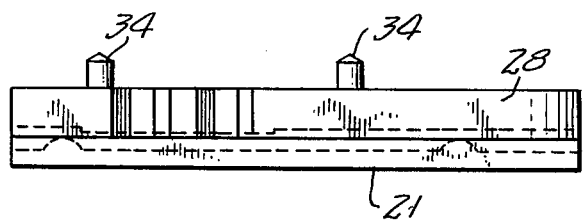

BRIDGE LIFTER MODULE

BACKGROUND OF THE INVENTION

This invention relates generally to the field of telephony, and more particularly to an improved form of telephone circuit module incorporating means for automatically switching bridged subscriber lines without the necessity of providing large tie jumpers and prior art saturable bridge lifter devices.

Although saddled with a degree of inconvenience from the standpoint of an individual subscriber, bridged subscriber circuits, commonly referred to as party lines, are still in wide use throughout the United States. In such connections, two or more individual subscriber lines share a common input and assigned telephone number, and where one of the bridged circuits is in use, the others are necessarily inoperative. In the traditional form of interconnection, several lines are connected from the connector block to a known saturation type bridge lifter which, in turn, connects the line in use to a terminal block and office switching equipment. The saturated type bridge lifter is a separate unit mounted upon the main distributing frame and requires long and costly cable runs when assembling the circuits on the main distributing frame. Apart from the cost of such devices, they occupy considerable space on the distributing frame, which might otherwise be more efficiently utilized.

As might be expected in the case of a long-standing problem, considerable progress has already been made in the art. A solid state bridge lifter circuit has been developed of size sufficiently small to permit mounting within the housing of a plug type protector module used to protect an individual subscriber line against the effects of overload. With more modern type connector blocks utilizing plug type protector modules, reassignment of central office lines is simply a matter of replacing existing protector modules with protector modules incorporating the solid state bridge lifter circuit. The resulting advantages include the saving of frame space, simplified administration, and savings in installation costs.

Unfortunately, many older telephone offices, having older type frame and connector block installations, are unable to use the above-described structure for the reason that the older style connector blocks employ protective devices which are not enclosed within a replaceable module. A typical example is the Western Electric type C-50A or C-52A protector. The usual heat coil and carbon block components are exposed and are mounted in operative position by resilient conductive spring blades having no means for accommodating the bridge lifting circuitry.

SUMMARY OF THE INVENTION

Briefly stated, the invention contemplates the provision of an improved solid state bridge lifter module, particularly adapted to be used in conjunction with older type connector blocks of a type which does not employ a housed protector module to provide the simplicity and convenience heretofore available only to offices having more contemporary type connector blocks which employ plug type protector modules. The inventive structure may be simply installed and removed, as required, and does not alter the function of existing subscriber circuit protection devices. The solid state circuit is encased within a synthetic resinous housing having protruding contact members adapted to be engaged by existing spring contacts when the device is installed. Means is provided whereby the housing may be disconnected from a connector block without disturbing externally engaged heat coils or protector blocks.

BRIEF DESCRIPTION OF THE DRAWINGS

In the drawings, to which reference will be made in the specification, similar reference characters have been employed to designate corresponding parts throughout the several views.

FIG. 4 is a view of perspective of one of a pair of contact members forming a part of the embodiment.

FIG. 5 is an end elevational view as seen from the lower portion of FIG. 3.

FIG. 6 is a side elevational view as seen from the left hand portion of FIG. 3.

FIG. 7 is a fragmentary view in perspective, showing the engagement of a spring finger with a carbon protector block.

DETAILED DESCRIPTION OF THE DISCLOSED EMBODIMENT

Figure 1:
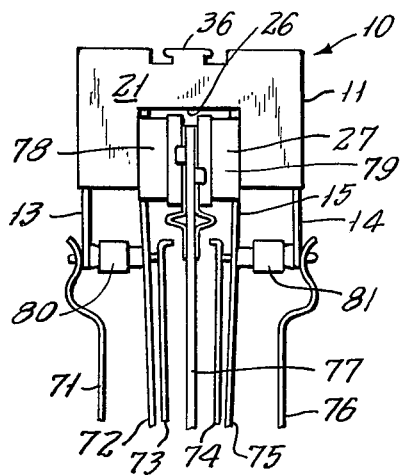
FIG. 1 is a fragmentary view in elevation, showing an embodiment of the invention in installed condition upon a known type of connector block.

In accordance with the invention, the device, generally indicated by reference character 10, comprises broadly: a housing element 11, a bridge lifter circuit element 12, and first and second contact members 13 and 14, respectively, interconnectable with the protector element 15 of a known connector block.

The housing element 11 is most conveniently formed to include first and second identical molded members 20, each bounded by an outer surface 21, a continuous inner surface 22, outer end surfaces 23, side surfaces 24, and an inner end surface 25, forming a rectangular-shaped recess 26 for the accommodation of a portion 27 of the structure 15.

The side surfaces 24 define a pair of elongated channels 28 which communicate with a plurality of transversely oriented channels 29 on the inner surface of each housing member 20. The channels 29 lead to a centrally disposed recess 30 in which the circuit element 12 is retained.

A pair of longitudinally arranged channels 31 of circular cross-section extend between the inner and outer end surfaces, the purpose of which will become more fully apparent, hereinafter. Various hollow recesses 32 are provided for lightness and the saving of moldable material, as is known in the art. A pair of sockets 33 are adapted to mate with corresponding plugs 34 on an oppositely disposed member 20 to maintain a pair of members in engaged condition. A recess 35 surrounds a manually engageable handle 36.

The rectangularly shaped recess 26 is bounded by a transversely extending surface 38, longitudinally extending surfaces 39 and 40, transversely extending surfaces 41 and 42, and longitudinally extending surfaces 43 and 44. Rectangular recesses are bounded by transverse surfaces 47 and 48 and longitudinal surfaces 49 and 50, respectively. These recesses include rectilinear projections 45 and 46 which selectively engage grooves 51 in the carbon blocks 78 and 79, as will more fully appear hereinbelow.

Figure 2:
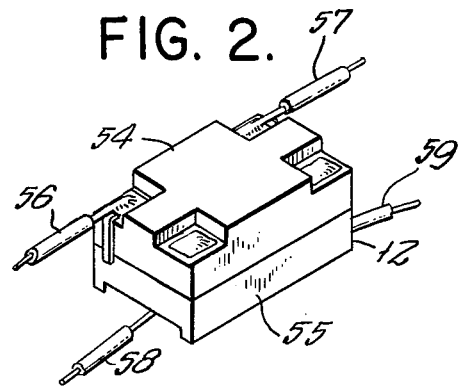
FIG. 2 is a view in perspective of an encapsulated bridge lifter circuit forming a part of the embodiment.
Figure 3:
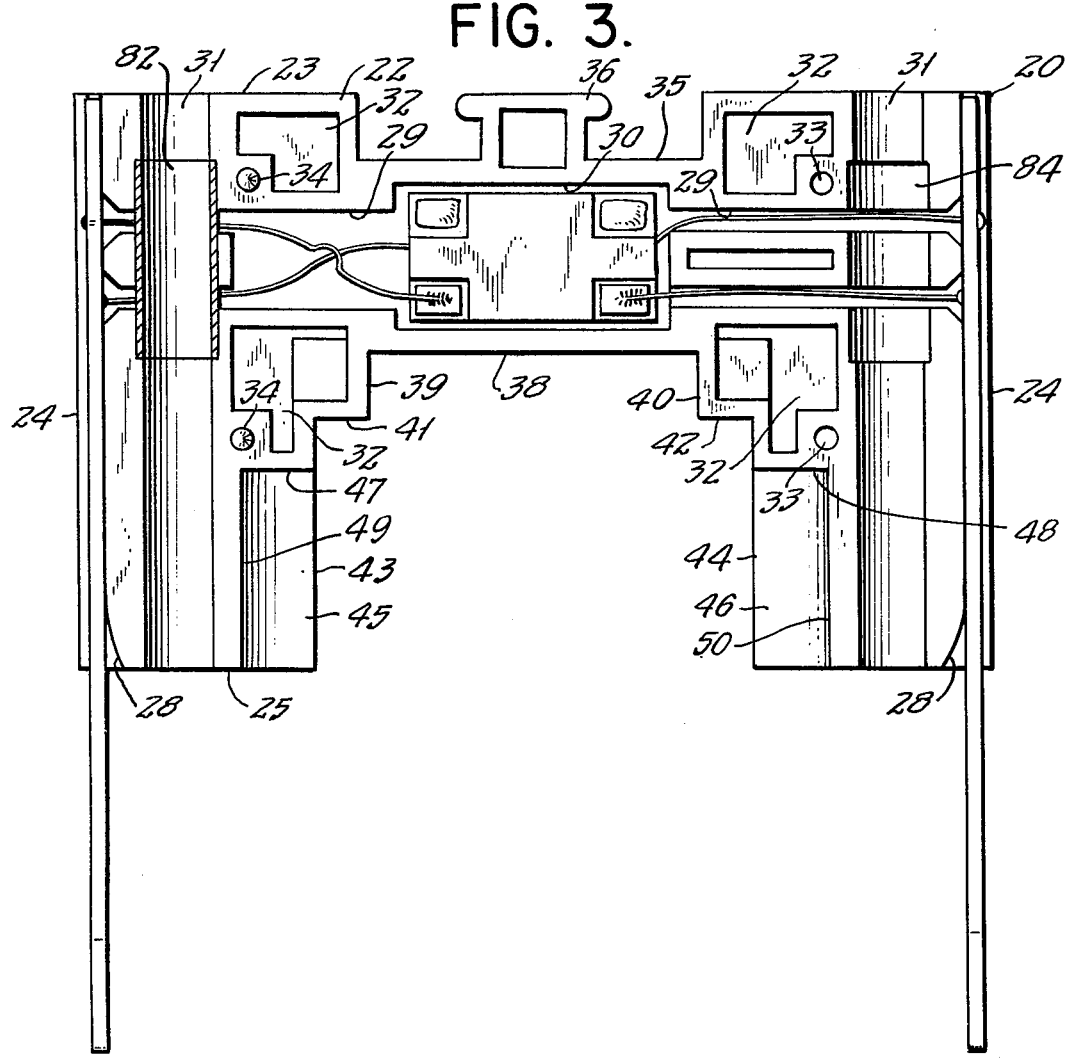
FIG. 3 is a view in elevation, showing the interior surface of one of a pair of interlocking members forming the disclosed embodiment.

The circuit element 12 is most conveniently formed as a thick film deposition upon ceramic substrates, using a circuit design and manufacturing techniques which are known in the art, the details of which are outside the scope of the present disclosure. The substrates are encapsulated between first and second casing members 54 and 55 (FIG. 2) from which leads 56, 57, 58 and 59 extend, as shown in FIG. 3.

The contact members 13 and 14 are preferably formed from insulative synthetic resinous material (see FIG. 4). They are each bounded by a pair of oppositely disposed side surfaces 61 and 62 which are coated with a conductive material which is discontinuous at the longitudinal side edges 63 and 64, the end edge 65 and the inner end edge 66. The edge 66 is provided with an elongated slot 67. First and second areas 68 and 69 are provided for the interconnection with the ends of an individual lead 56–59.

Referring again to FIG. 1, the protector element 15, with which the device 10 is used, includes a plurality of spring fingers 71, 72, 73, 74, 75 and 76, arranged on either side of a centrally disposed plate 77. Carbon type protector blocks 78 and 79 are maintained in position by the fingers 72 and 75, which enter grooves 51, while heat coils 80 and 81 are maintained by the fingers 71 and 76.

The device 10 is interconnected with the element 15 by engaging the slots 67 of each of the contact members 13 and 14 beneath the spring fingers 71 and 76 to bear against an end of one of the heat coils 80 and 81. During this positioning, the protector blocks 78 and 79, and the ends of the spring fingers 72 and 75 are positioned such that the projections 45 and 46 prevent any rotational movement of the device 10 about an axis through the heat coils 80 and 81 after installation. It will be observed that the configuration of the device 10, being essentially planar, permits the installation of adjacent devices 10 without difficulty.

When it is desired to remove the device, dislodgement of the heat coils 80 and 81 is prevented by the insertion of a forked tool (not shown) within the channels 31, so that the free ends of the tool bear against the heat coils. The channels 31 are maintained clear by the insertion of a cylindrical sleeve 82 in each of them, the outer surface of which contacts portions of the leads 56–59. The sleeve 82, in turn, is maintained in position by the provision of a corresponding channel 84 of corresponding dimension.

It will be apparent that all of the convenience available to users of contemporary type connector blocks are thus made available to telephone offices having older equipment in which the protective devices are not of modular construction. The device 10 may be conveniently manufactured at relatively low cost with a minimum of tooling, thus permitting relatively small economic production runs.

We wish it to be understood that we do not consider the invention limited to the precise details of structure shown and set forth in this specification, for obvious modifications will occur to those skilled in the art to which the invention pertains.

We claim:

1. A bridge lifter module for use in conjunction with a telephone connector block having a plurality of exposed electrically conductive spring fingers, comprising: a casing element including first and second synthetic resinous generally planar members disposed in abutted relation to define an internal recess therebetween, an encapsulated bridge lifter circuit element secured within said recess and having leads projecting outwardly thereof to a pair of exposed surfaces of said planar members, a pair of flexible elongated contact members mounted upon said exposed surfaces, each contact member having a pair of oppositely disposed electrically conductive surfaces thereon, each of said conductive surfaces communicating with one of said leads, said contact members extending outwardly of said housing element in a single direction, and having free ends thereon for engagement between said spring fingers of said connector block to be retained thereby.

2. A module in accordance with claim 1 further characterized in the provision of a projection of said housing element positioned between the outwardly extending ends of said contact members for the engagement of a corresponding grooved portion of a connector block element to prevent rotation of said module about an axis passing through the points of attachment of said contact members with said connector block.

3. A module in accordance with claim 1, further characterized in the provision of a pair of channels extending longitudinally through said housing element and parallel to said contact members for the insertion of a tool for retaining resiliently held parts of said connector block in position during the disengagement of said module therefrom.

* * * * *